United States Patent [19]

Estess

[11] 4,174,100
[45] Nov. 13, 1979

[54] ADJUSTABLE FENCE

[75] Inventor: John H. Estess, Tupelo, Miss.

[73] Assignee: Rockwell International Corporation, Pittsburgh, Pa.

[21] Appl. No.: 890,145

[22] Filed: Mar. 27, 1978

[51] Int. Cl.² .................................................. B23Q 3/00
[52] U.S. Cl. .................................................... 269/306
[58] Field of Search .............................. 269/297–301, 269/304–306, 315–320; 144/253 R, 253 G, 253 J; 83/467–468, 438, 446–447

[56] References Cited

U.S. PATENT DOCUMENTS

| 2,129,133 | 9/1938 | Iben | 269/306 |
|---|---|---|---|
| 3,348,591 | 10/1967 | Carrasco | 269/297 |

FOREIGN PATENT DOCUMENTS 365831  1/1932  United Kingdom ................ 144/253 J Primary Examiner—Robert C. Watson

[57] ABSTRACT

A rip fence for table saws extensively used in woodworking. The rail of the fence is made in two parts, the lower one being vertically adjustable to provide a minimum table clearance.

4 Claims, 3 Drawing Figures

ADJUSTABLE FENCE

BACKGROUND OF THE INVENTION

This invention pertains to a work-guiding fence for use with mechanically driven tools, and more specifically finds extensive use with motor driven woodworking tools, such as circular saws, band saws, scroll saws, etc. Gauges (or fences) of this type have been used in varying degrees of sophistication for many years. One of the better examples is shown and described in U.S. Pat. No. 2,325,082.

With the greatly increased use of laminates and veneers in recent years, however, the clearance of the gauge above the worktable became critical. These new, thinner, pieces would find their way between the table surface and the bottom of the rail on some tools when the accumulated manufacturing tolerances all worked the wrong way.

SUMMARY OF THE INVENTION

Accordingly, it is a principal object of this invention to provide a rip fence (or work gauge) that has a bottom portion vertically adjustable to provide the capability of fixing the table abutting surface as close to the table surface as desired.

It is a further object of this invention to provide an adjustable fence for a woodworking tool to permit assembly of mass-produced items to be accomplished, leaving a precision accessory as the finished product.

DESCRIPTION OF THE PREFERRED EMBODIMENT

Figure 1:
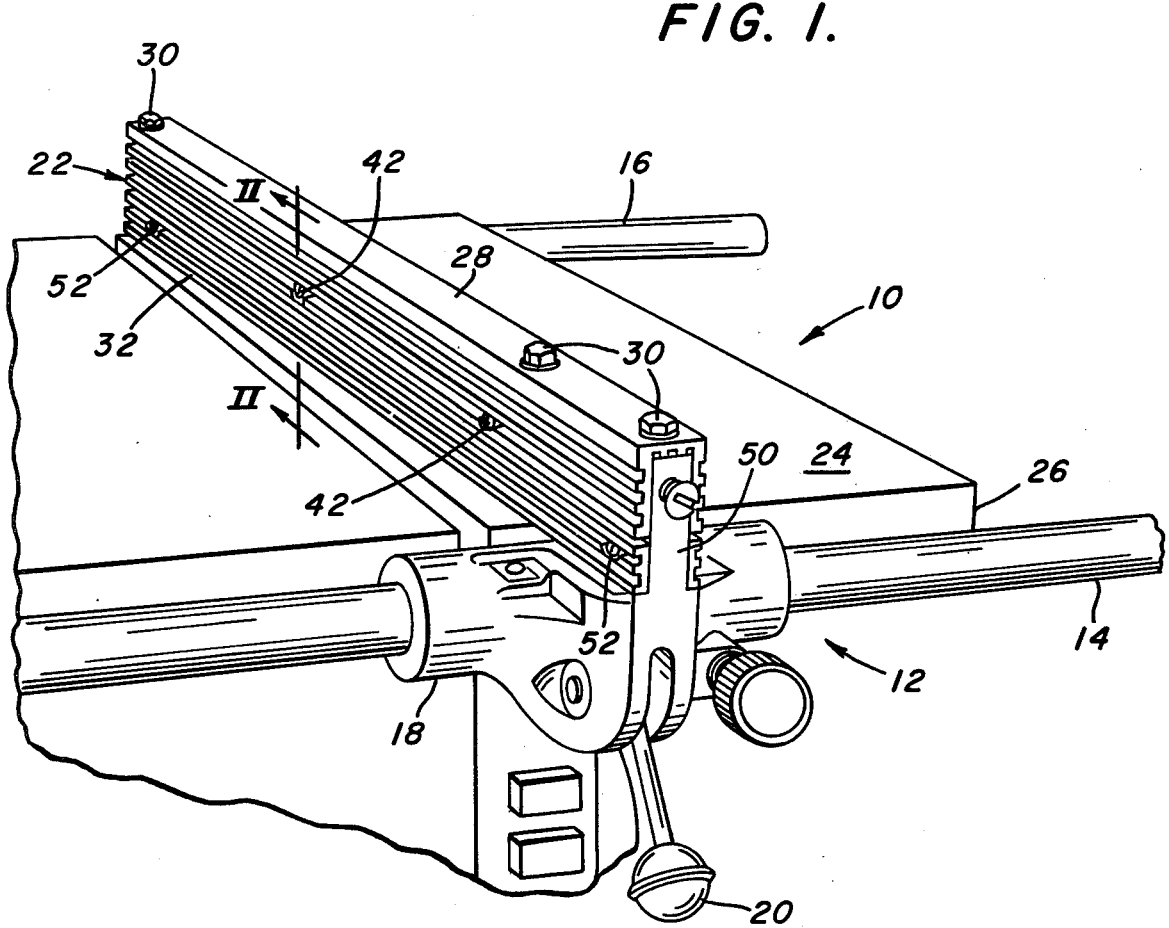
FIG. 1 shows the rip gauge in place on a saw table, only a portion of the table and base of the saw being shown.
Figure 2:
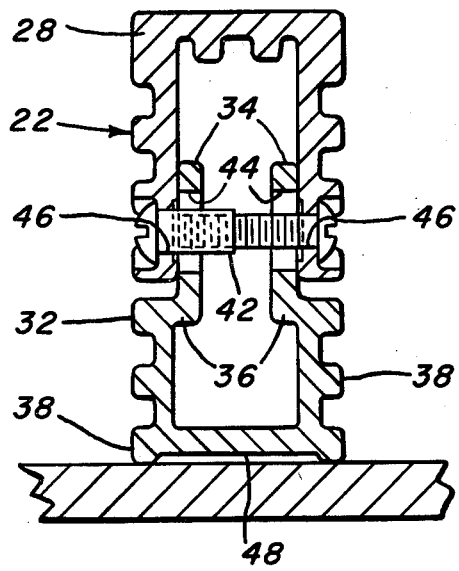
FIG. 2 is a section along II—II of FIG. 1.

FIG. 1 shows a portion of a table saw 10 with a gauge 12 mounted on front and rear guide rails 14 and 16 respectively. Work gauges of this type have been used for many years, with the guide rails and clamping brackets being of many forms. These shown here are more fully described in U.S. Pat. No. 2,630,845, the specification of which may be referred to for a fuller understanding of the operation. The above-mentioned patent, assigned to a predecessor of the assignee of this application, is hereby incorporated by reference.

These gauges are most frequently used on table saws in the woodworking field, and are adjustably set (and fixed in place) varying distances from the saw blade to guide the workpiece past the saw blade. The gauge assembly 12 is most often used for ripping a long length, but can be used for a stop for cutting off, or for making bevel cuts. In all the operations, however, the front clamping bracket 18 and the rear clamping bracket (not shown) are locked in the clamped position by handle 20.

Figure 3:
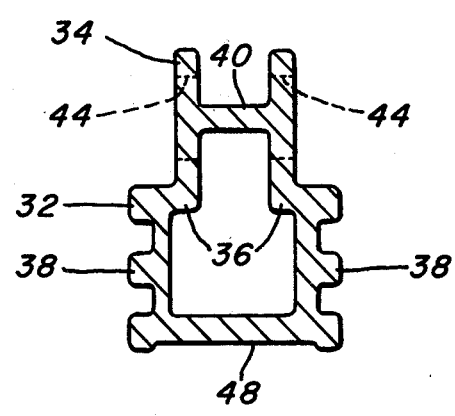
FIG. 3 is a section through the lower member of the two-part rail, showing the reinforcing cross rib.

With the popularity of laminates and veneers, extremely thin sheets of material are being worked on by carpenters and others. This means that the elongated rail 22 of the gauge assembly 12 must have a minimum of clearance from the top 24 of table 26 of the saw 10. In the instant invention, rail 22 is made in two pieces. The top portion 28 has a channel-shaped configuration, with the open side facing the saw table 26. It is fixed to the clamping brackets at the front and rear by machine bolts 30. The lower part 32 of rail 22 has the shape shown in FIG. 3, with upstanding legs 34 adapted to closely fit inside the downwardly depending legs of top 28. These upstanding legs are outwardly offset at 36 so that the outer faces 38 of the bottom portion of lower part 32 are co-planar with the vertical faces of the top part 28 of rail 22. A stiffening rib 40 runs horizontally longitudinally between legs 34, and suitable fasteners 42 extend through vertically elongated openings 44 in lower part 32. These fasteners snugly fit holes 46 in the downwardly depending legs of the top rail portion 28. When the fasteners 42 are drawn up tightly, they pull the depending legs of top 28 into snug frictional engagement with upstanding legs 34 of lower portion 32. From this description, it will be seen that the vertical positioning of the top 28 of rail 22 with respect to the table surface 24 depends on the manufacturing and assembly tolerances of the guide rails 14 and 16, the clamping brackets (only the front one, 18, is shown), and top 28 itself. Thus, the ability to adjust the lower part 32 of rail 22 becomes almost a necessity, with the increased use of extremely thin materials, as mentioned above. It should be observed here that the ribs and grooves shown on the external side faces of the two parts of rail 22 were merely selected to give a rigid section, yet with light weight for ease of moving the guide over the saw table. The exterior surfaces could just as well be planar, so long as the upper 28 and lower 32 parts of rail 22 are co-planar on each face. Also, the recess 48 in the bottom surface is a convenience to reduce frictional contact with the table top 24. The rib 40, however, is necessary to provide support to the legs 34.

At the ends of the lower part 32, where the sides of the lower part embrace the upstanding leg 50 of front clamping bracket, and at the rear clamping bracket which is not shown, the upstanding legs 34, the stiffening rib 40, and the offset, or connecting portion 36 is removed, as is the bottom planar surface 48 of lower part 32. This leaves the two outer portions 38 to enclose the lower portion of leg 50. A fastener 52, similar to fasteners 42, is used to keep these outer portions in place. A similar construction is at the back end. These fasteners 52 do not engage the legs of the clamping brackets, merely keeping the portions 38 snug to the brackets.

From the above description it can be seen that, after initial assembly of the guard (or fence) in place over the saw table, or whenever it is desired to adjust the clearance of the rail 22 over the table top 24, the fasteners 42 and the fasteners 52 can be slightly loosened and the lower part 32 of the rail can be vertically positioned where desired. The fasteners are then snugged up, and the guide is ready for use. The accumulated manufacturing and assembly tolerances are accommodated, and an accurate guide suitable for exceptionally thin sheets of material is ready for use.

I claim:

1. A guage adapted for use with a machine tool having a worktable, gauge supporting means separate from the table but secured thereto adjacent both the front and the rear edges thereof, said means providing gauge clamping surfaces therealong, said gauge being movable over said table, said gauge having front and rear clamping brackets, and a two-part rail member connecting said clamping brackets, said two-part rail member comprising, a downwardly open channel-shaped upper member fixed to said clamping brackets and a table-engaging lower member adjustably fixed to said upper member.

2. The gauge of claim 1 wherein said lower rail member has upwardly extending leg portions closely received within said downwardly open channel-shaped upper member.

3. A work-guiding gauge adapted for use with a machine tool having a worktable and movable thereover, said gauge comprising front and rear clamping brackets for engagement with table members for adjustably clamping said gauge in any of a plurality of desired locations over said table, said clamping brackets fixed one at each end of one part of a rail member, said one part having a downwardly-open channel shape in transverse cross-section, and the downwardly-extending legs of said one part closely engaging a second part of said rail member, said second part being vertically adjustable with respect to said first part, the two parts being adjustably fixed by releasable means.

4. In a woodworking machine having a work-receiving table and a work-guiding gauge movable thereover, means for adjusting the vertical clearance of the gauge with respect to the table, said means comprising a two-part rail member, one part of which is suspended above said table on front and rear clamping brackets, the other part of said rail member being vertically adjustably suspended from said one part, whereby said other part may be adjusted for a desired clearance from said table, said other part depending from said one part between said one part and said work-receiving table, said two parts presenting a co-planar work-engaging surface normal to the surface of said work-receiving table.

* * * * *